United States Patent [19]

Itoyama et al.

[11] Patent Number: 4,485,263
[45] Date of Patent: Nov. 27, 1984

[54] THERMOCOUPLE INSTRUMENT

[75] Inventors: Masaru Itoyama, Kanagawa; Takashi Kuze, Yokohama, both of Japan

[73] Assignee: Tokyo Shibaura Denki Kabushiki Kaisha, Japan

[21] Appl. No.: 419,602

[22] Filed: Sep. 17, 1982

[30] Foreign Application Priority Data

Sep. 29, 1981 [JP] Japan .............................. 56-154231

[51] Int. Cl.³ ............................................ H01L 35/02
[52] U.S. Cl. .................................. 136/230; 136/242; 374/208
[58] Field of Search ................. 136/230, 242; 374/208

[56] References Cited

U.S. PATENT DOCUMENTS

| | | | |
|---|---|---|---|
| 2,187,949 | 1/1940 | Noble | 136/230 X |
| 2,405,075 | 7/1946 | Vollrath | 136/242 |
| 3,898,431 | 8/1975 | House et al. | 136/233 |
| 3,942,242 | 3/1976 | Rizzolo | 136/233 |
| 4,060,094 | 11/1977 | McAinsh | 136/230 |
| 4,131,756 | 12/1978 | Smith | 136/230 |

Primary Examiner—Leland A. Sebastian
Attorney, Agent, or Firm—Cushman, Darby & Cushman

[57] ABSTRACT

A thermocouple instrument which includes a thermocouple element formed of two dissimilar conductors joined at the ends thereof; an inner protecting metal tube for containing said thermocouple element together with an insulating material and electrically insulated from said thermocouple element via the insulating material; and an outer protecting metal tube in which said inner protecting metal tube is inserted. In this thermocouple instrument, the thermal expansion coefficient of the metal forming said inner protecting metal tube is equal to or higher than the thermal expansion coefficient of the metal forming said outer protecting tube, and accordingly the inner protecting metal tube is rigidly engaged within the outer protecting metal tube with excellent vibration resistance and impact resistance.

9 Claims, 4 Drawing Figures

THERMOCOUPLE INSTRUMENT

BACKGROUND OF THE INVENTION

The present invention relates to a thermocouple instrument and, more particularly, to a thermocouple instrument having a structure capable of enduring a vigorous vibration and impact.

A conventional thermocouple instrument which has been heretofore used, for example, in an aircraft engine to measure the temperature of the engine itself or of exhaust gas from the engine employed, to endure high temperature and corrosive atmosphere, a structure in which a thermocouple element formed of two dissimilar conductors joined at the ends was mounted together with an insulating powder in an inner metal protecting tube which was further mounted in an outer metal protecting tube. In order to avoid a loss responsiveness in detecting the temperature in such a structure, an air gap was normally provided in the end part of the outer metal protecting tube and a pair of small holes were formed at both side surfaces of the ends of the protecting tube, and gas to be measured at its temperature flowed through the small holes in the air gap.

When this thermocouple instrument was used to measure the temperature of the aircraft engine itself or of the exhaust gas of the engine, the thermocouple instrument was exposed to vigorous vibration and impact. When the thermocouple instrument thus constructed was exposed to such severe vibration and impact, the inner and outer metal protecting tubes came into violent contact with each other and were resultantly damaged. Therefore, various trials of fixedly securing both the outer and inner protecting tube have been heretofore carried out. However, the attachment has not been sufficient, additional members have been required, and the structure of the instrument has thus been complicated, resulting in a difficulty in securing both the outer and inner protecting tubes.

SUMMARY OF THE INVENTION

It is an object of the present invention to provide a thermocouple instrument which has excellent vibration resistance and impact resistance at a high temperature and in which an inner protecting metal tube for containing a thermocouple element is rigidly mounted and retained within an outer protecting metal tube.

According to the present invention, there is provided a thermocouple instrument comprising a thermocouple element formed of two dissimilar conductors joined at the ends thereof; an inner protecting metal tube for containing said thermocouple element together with insulating material electrically insulated from said thermocouple element via the insulating material; and an outer protecting metal tube into which said inner protecting metal tube is inserted, wherein the thermal expansion coefficient of the metal forming said inner protecting metal tube is not lower than the thermal expansion coefficient of the metal forming said outer protecting metal tube.

BRIEF DESCRIPTION OF THE DRAWINGS

The invention is best understood by reference to the accompanying drawings of which.

DETAILED DESCRIPTION OF THE PREFERRED EMBODIMENTS

An embodiment of the present invention will now be described in more detail with reference to the accompanying drawings.

Figure 1:
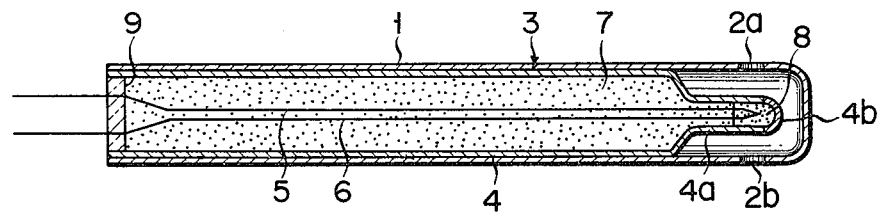
FIG. 1 is a sectional view of a thermocouple instrument according to an embodiment of the present invention.
Figure 2:
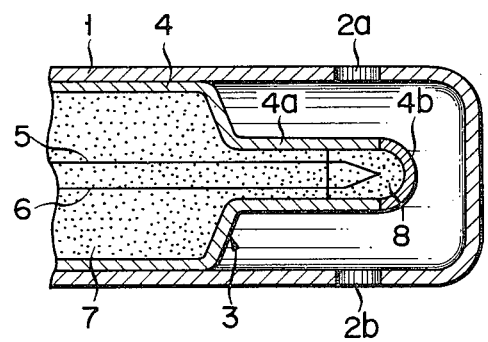
FIG. 2 is an enlarged sectional view of the end part of the thermocouple instrument in FIG. 1.

FIG. 1 is a sectional view of a thermocouple instrument according to a preferred embodiment of the present invention. In FIG. 1, an outer protecting tube 1 is formed of a metal having excellent corrosion resistance and heat resistance such as, for example, an Hastelloy X. This outer protecting tube 1 is of a cylinder which is closed at one end and which is opened at the base. Holes 2a, 2b for passing gas, e.g., exhaust gas to be measured for its temperature are confronted and formed at the peripheral wall of the end of the outer protecting tube 1. A sheath type thermocouple 3 is inserted and mounted in the outer protecting tube 1. This sheath type thermocouple 3 is integrally pressure-molded by containing wires 5, 6 of thermocouple element and insulating powders 7, 8 in the inner protecting tube 4. The wires 5, 6 are dissimilar conductors joined at the ends.

The inner protecting tube 4 is formed of a metal which has a thermal expansion coefficient equal to or higher than the thermal expansion coefficient of the metal forming the outer protecting tube 1. The inner protecting tube 4 is preferably formed of a metal which has corrosion resistance and heat resistance. In this embodiment, the inner protecting tube 4 is formed of Inconel 600. The thermal expansion coefficient of Inconel 600 forming the inner protecting tube 4 is about $13.4 \times 10^{-6}/°C.$, and the thermal expansion coefficient of Hastelloy X forming the outer protecting tube 1 is about $7.7 \times 10^{-6}/°C.$ Even if the thermal expansion coefficient of the metal forming the inner protecting tube 4 is equal to the thermal expansion coefficient of the metal forming the outer protecting tube 1, predetermined securing effects can be obtained. More rigid securing effects can be obtained when the coefficient of the inner tube is higher than that of the outer tube, and this is accordingly preferred. It is preferable that the inner tube coefficient by higher by about 2 to $10 \times 10^{-6}/°C.$ It is more preferable that the inner tube coefficient be higher by about 3 to $8 \times 10^{-6}/°C.$ The preferable combination of both the metals will be listed in the following Table:

TABLE

| | Metal | Thermal expansion coefficient |
|---|---|---|
| Outer protecting tube | Cr: 18 wt %, Ni: 12 wt %, Ti: ≦5 wt %, Fe: balance (SUS 321) | $9.3 \times 10^{-6}/°C.$ |
| | Cr: 17 wt %, Ni: 12 wt %, Mo: 3 wt %, Fe: balance (SUS 316) | $8.9 \times 10^{-3}/°C.$ |
| | Cr: 21 wt %, Al: 1 wt %, Ti: 2.5 wt %, Ni: balance (NIMONIC 80A) | $6.2 \times 10^{-6}/°C.$ |
| | Cr: 22 wt %, Co: 1.5 wt %, Mo: 9 wt %, Ni: balance (Hastelloy X) | $7.7 \times 10^{-6}/°C.$ |
| Inner protecting tube | Ni + Co: 72 wt %, Cr: 16 wt %, Fe: balance (Inconel 600) | $13.4 \times 10^{-6}/°C.$ |
| | Ni: 32 wt %, Cr: 21 wt %, | $14.3 \times 10^{-6}/°C.$ |

TABLE-continued

| Metal | Thermal expansion coefficient |
|---|---|
| Fe: balance (Inconel 800) Cr: 19 wt %, Fe: 18 wt %, Mo: 3 wt %, Ti: 1 wt %, Ni: balance (Inconel 718) | $15 \times 10^{-6}/°C$ |
| Ni + Co: 70 wt %, Cr: 15 wt %, Ti: 2.5 wt %, Fe: balance (Inconel X 750) | $12.6 \times 10^{-6}/°C$ |

The inner protecting tube 4 is formed in a cylindrical body. The end 4a of the inner protecting tube 4 is formed with a diameter smaller than the other and is once a convergent shape, and the other end of the inner protecting tube 4 is opened. The end 4a of the inner protecting tube encloses the end joint of the wires 5, 6 forming a thermocouple element. The diameter of the end 4a is formed in consideration of the responsiveness of detecting the temperature, and its length is sufficient to enclose the joint of the wires 5, 6. The top 4b of the end 4a of the inner protecting tube 4 may be formed integrally with the inner protecting tube 4, but may also be separately formed and may be joined by welding to the end 4a of the inner protecting tube 4.

The wires 5, 6 are disposed along the axis of the tube in the inner protecting tube 4. The ends of the wires 5, 6 are joined by welding, and are disposed within the end 4a of the inner protecting tube 4. The wires 5, 6 are formed in combination of metals of different types such as for example, platinum-platinum rohdium, almel-cromel, etc.

The insulating powder 7 is filled in a space ranging from the body of the inner protecting tube 4 to a part of the end 4a of the inner protecting tube 4. Another insulating powder 8 is filled in the portion surrounding the joined end of the wires 5, 6 of the end 4a of the inner protecting tube 4, and both the insulating powders 7, 8 are respectively held to bury the entire wires 5, 6 in the inner protecting tube 4. The insulating powders 7, 8 electrically insulate the wires, 4, 5 from the inner protecting tube 4. Particularly, the insulating powder 8 rapidly transfers the temperature to be measured to the joined end of the wires 4, 5. The insulating powder 7 may be, for example, magnesia (MgO). The insulating powder 8 may be, for example, a powder containing as a main component boron nitride (BN) or beryllium oxide (BeO) which has higher heat conductivity than the general insulating material such as magnesia.

The base of the inner insulating tube 4 is sealed with sealing member 9 which is, formed of glass, silicone, heat resistant resin, etc., and the wires 4, 5 externally extend through the sealing member 9. In general, the base of the sheath type thermocouple is not necessarily sealed, but may be sealed depending on the environments. In other words, the thermocouple instrument, by the use of the sealing member 9, can be used in an aggressive worse environment where oil mist is scattered the interior of an aircraft engine.

The sheath type thermocouple 3 which is formed of the inner protecting tube 4, wires 5, 6 and insulating powders 7, 8 is inserted into the outer protecting tube 1, and is held and secured to the outer protecting tube 1 by welding the bases of the inner and outer protecting tubes 4 and 1 or by reducing the diameter of the base of the outer protecting tube 1.

The thermocouple instrument thus constructed can be, for example, installed in the exhaust gas passage of an aircraft engine and can be used to measure the temperature of the exhaust gas. In this case, the exhaust gas to be measured is introduced from the holes 2a, 2b into the air gap at the end of the outer protecting tube 1 to fill the periphery of the end 4a of the inner protecting tube 4 for containing the joined portion of the wires 5, 6. The temperature of the exhaust gas is measured in such a manner that the temperature of the gas is transferred through the insulating powder 8 to the joined end of the wires 5, 6, causing a thermoelectromotive force to be produced between the wires 5 and 6, and the thermoelectromotive force is then detected by an instrument connected to the wires 5 and 6.

As described above, when the thermocouple instrument of the present invention is arranged to measure at the high temperature of exhaust gas of an aircraft engine, e.g., 700° to 1,400° C., the air gap between the inner protecting tube 4 and the outer protecting tube 1 disappears due to the thermal expansion of the inner protecting tube 4, and the sheath type thermocouple 3 is rigidly engaged to the outer protecting tube 1 to be mounted and held therewith. Therefore, even if severe vibration and impact are applied to the thermocouple instrument of the present invention when it is disposed in the exhaust gas stream flowing at a superhigh speed, the outer surface of the inner protecting tube 4 will not come into violent contact with inner surface of the outer protecting tube thus causing damage. When vibration and impact are applied to the conventional thermocouple instrument at a high temperature, there have been problems such as disconnection or deformation of wires, and improper insulation between the wires and the inner protecting tube due to the deformation of the wires. However, according to the thermocouple instrument of the present invention, such problems cannot take place at all. Since the sheath type thermocouple 3 can be held in the outer protecting tube 1, without using a supporting member, the above-described problems can be eliminated while maintaining a simple structure in the thermocouple instrument of the present invention.

In the embodiment described above, the diameter of the end 4a of the inner protecting tube 4 may be made smaller than the other portion. Since the distance between the outer surface of the end 4a of the inner protecting tube 4 and the joined end of the wires 4, 5 can be shortened in this case, the temperature of the exhaust gas can be transferred to the joined end of the wires 5, 6 in an extremely short time, with the result that the responsiveness of measuring the temperature can be improved. In the embodiment described above, boron nitride or beryllium oxide which has high thermal conductivity is employed as the insulating powder 8 to enclose the joined end of the wires 5, 6, and therefore, further improving the responsiveness of measuring the temperature. The boron nitride is not limited in use into the end 4a of the inner protecting tube 4, but may also be filled in the other portion.

Figure 3A:
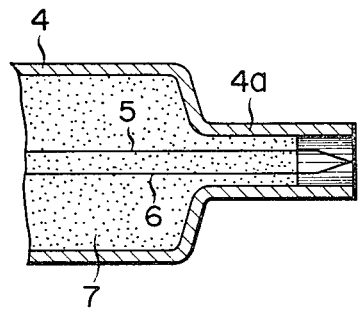
FIGS. 3A and 3B are respectively sectional views showing the steps of manufacturing the thermocouple instrument in FIG. 1.
Figure 3B:
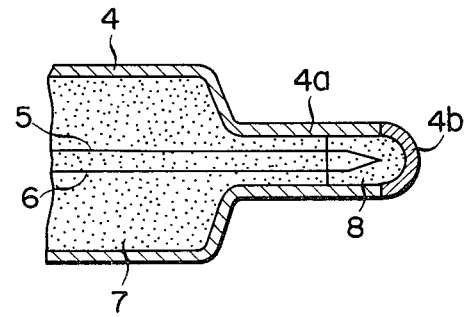

The sheath type thermocouple 3 of the thermocouple instrument of the present invention can be, for example, manufactured as below. As shown in FIG. 3A, the wires 5, 6 are first disposed in the inner protecting tube 4 before being joined with the end 4b of the end 4a, and the insulating powder 7 is filled therein. Subsequently, drawing of the end 4a is performed. Swagging is employed as the drawing. In this state, the ends of the wires 5, 6 are not yet joined, but are disposed at the opening of the end 4a of the inner protecting tube 4. In this state, the wires 5, 6 are joined by welding at the ends. Since the wires 5, 6 are buried and held stably in the insulating powder 7, the welding work can be facilitated. Subsequently, as shown in FIG. 3B, the insulating powder 8 is filled from the opening of the end 4a of the inner protecting tube 4, and the top 4b of the end of the inner protecting tube 4 is welded to the opening of the end 4a of the inner protecting tube 4. Thus, the insulating powder 8 can be readily filled therein.

What we claim is:

1. A thermocouple instrument comprising:
   a thermocouple element formed of two dissimilar conductors joined at the ends thereof;
   a rigid inner protecting metal tube for containing said thermocouple together with an insulating material and electrically insulated from said thermocouple element via the insulating material; and
   a rigid outer protecting metal tube of the metal forming said inner protecting metal tube is not lower than the thermal expansion coefficient of the metal forming said outer protecting tube, wherein the inner protecting metal tube is rigidly mounted and retained within the outer protecting metal tube due to the thermal expansion of the inner protecting metal tube at high temperatures.

2. The thermocouple instrument according to claim 1, wherein the thermal expansion coefficient of the metal forming said inner protecting metal tube is higher than the thermal expansion coefficient of the metal forming said outer protecting metal tube.

3. The thermocouple instrument according to claim 2, wherein the thermal expansion coefficient of the metal forming said inner protecting metal tube is higher by about $2 \times 10^{-6}/°C$. to $10 \times 10^{-6}/°C$. than the thermal expansion coefficient of the metal forming said outer protecting metal tube.

4. The thermocouple instrument according to claim 3, wherein the thermal expansion coefficient of the metal forming said inner protecting tube is higher by about $3 \times 10^{-6}/°C$. to $8 \times 10^{-6}/°C$. than the thermal expansion coefficient of the metal forming said outer protecting tube.

5. The thermocouple instrument according to claim 1, wherein the end of said inner protecting metal tube at the temperature detecting side is formed in diameter smaller than the other portion, and small holes are formed in the vicinity of the end of said outer protecting metal tube.

6. The thermocouple instrument according to any of claims 1 to 4, wherein that part of said insulating material which is contained in the end of said inner protecting metal tube at the temperature detecting side is a powder containing boron nitride or beryllium oxide as a main component.

7. The thermocouple instrument according to claim 1, wherein the other end of said inner protecting metal tube is sealed with a sealing member and said conductors externally extend through said sealing member.

8. The thermocouple instrument according to claim 7, wherein said sealing member is formed of one selected from the group consisting of glass, silicone and heat resistant resin.

9. A thermocouple instrument to sense the temperature of a heated fluid medium comprising:
   a rigid inner protecting metal tube having a reduced-diameter section at one end, said inner protecting metal tube having a first coefficient of thermal expansion;
   a thermocouple element formed of two dissimilar conductors joined together at an end thereof, said thermocouple element disposed in said inner protecting metal tube such that said joined end is positioned in said reduced-diameter section;
   an insulating material filled in said inner protecting metal tube to electrically insulate said thermocouple element and said inner protecting metal tube; and
   a rigid outer metal sleeve tube rigidly enveloping said inner tube, said outer sleeve tube defining with said reduced-diameter section an interior cavity and including apertures in communication with said interior cavity to permit introduction of heated fluid medium therein so that said thermocouple element can sense the temperature thereof, said outer sleeve tube having a second coefficient of thermal expansion which is less than said first coefficient, whereby
   said inner tube is retained within said outer sleeve tube by virtue of the difference in thermal expansions of said inner and outer sleeve tubes when said thermocouple element is exposed to said heated fluid medium.

* * * * *